(12) United States Patent
Langenfeld

(10) Patent No.: US 9,676,318 B2
(45) Date of Patent: Jun. 13, 2017

(54) TRAILER STEP AND GUIDE

(71) Applicant: Gregg Donald Langenfeld, Fond du Lac, WI (US)

(72) Inventor: Gregg Donald Langenfeld, Fond du Lac, WI (US)

(*) Notice: Subject to any disclaimer, the term of this patent is extended or adjusted under 35 U.S.C. 154(b) by 267 days.

(21) Appl. No.: 14/520,429

(22) Filed: Oct. 22, 2014

(65) Prior Publication Data
US 2015/0210201 A1 Jul. 30, 2015

Related U.S. Application Data

(60) Provisional application No. 61/932,787, filed on Jan. 29, 2014.

(51) Int. Cl.
*B60P 3/10* (2006.01)
(52) U.S. Cl.
CPC ................... *B60P 3/1075* (2013.01)
(58) Field of Classification Search
CPC ...... B60P 3/1033; B60P 3/1066; B60P 3/1075
USPC ........... 280/414.1, 414.2, 414.3, 163, 164.1; 182/20, 91, 127
See application file for complete search history.

(56) References Cited

U.S. PATENT DOCUMENTS

| | | | |
|---|---|---|---|
| 2,458,618 A | 1/1949 | McDonald | |
| 2,827,304 A * | 3/1958 | Backus | B60P 3/1075 280/143 |
| 3,455,472 A * | 7/1969 | Rankin, Jr. | B60P 3/1075 193/35 R |
| 3,539,065 A * | 11/1970 | Brownell | B60P 3/1033 414/458 |
| 3,993,324 A | 11/1976 | Carrick | |
| 4,033,600 A | 7/1977 | Watson | |
| 4,641,851 A * | 2/1987 | Knies | B60P 3/1033 114/344 |
| 4,911,459 A * | 3/1990 | Smyly, Sr. | B60P 3/1058 280/414.1 |
| 5,004,260 A * | 4/1991 | Smyly, Sr. | B60P 3/1058 114/344 |
| 5,172,928 A * | 12/1992 | Capps | B60P 3/1033 280/164.1 |
| 6,616,166 B2 | 9/2003 | Marchese | |
| 6,986,523 B1 | 1/2006 | Bickford | |
| 8,256,789 B2 | 9/2012 | Bryant, II | |

(Continued)

*Primary Examiner* — Joseph Rocca
*Assistant Examiner* — Conan Duda
(74) *Attorney, Agent, or Firm* — Ziolkowski Patent Solutions Group, SC

(57) ABSTRACT

A step-and-guide apparatus that aids on centering a boat on a boat trailer and assists an operator in boarding and exiting the boat when on the water or on land is disclosed. The step-and-guide apparatus has first and second guide mechanisms positioned on opposing sides of a trailer frame, and each apparatus includes a trailer mount assembly, a bracket arrangement, an arm having a first end and a second end, with a first end of the arm being rotatably coupled to the bracket arrangement, and a step-and-guide board affixed to the second end of the arm and that is oriented lengthwise along the boat. The arm and the step-and-guide board are rotatable between a first position and a second position defined by the bracket arrangement, with the step-and-guide board functioning as a step when in the first position and as a boat guide member when in the second position.

21 Claims, 13 Drawing Sheets

(56) References Cited

U.S. PATENT DOCUMENTS

| | | | |
|---|---|---|---|
| 8,322,739 B1* | 12/2012 | Fair | B60P 3/1066 280/164.1 |
| 9,114,856 B2* | 8/2015 | Hannan | E06C 1/00 |
| 2003/0189312 A1* | 10/2003 | McNamee | B60P 3/1066 280/414.1 |
| 2006/0001236 A1* | 1/2006 | McGinty | B60P 3/1066 280/414.1 |
| 2007/0000723 A1* | 1/2007 | Jensen | E06C 7/183 182/127 |
| 2008/0023937 A1* | 1/2008 | Bryant | B60P 3/1066 280/414.1 |
| 2009/0302572 A1* | 12/2009 | Bryant, II | B60P 3/1066 280/414.1 |
| 2011/0011675 A1* | 1/2011 | Ebbenga | B60D 1/58 182/106 |
| 2014/0131976 A1* | 5/2014 | Olds | B60P 3/1066 280/414.1 |

* cited by examiner

TRAILER STEP AND GUIDE

CROSS-REFERENCE TO RELATED APPLICATION

The present application is a non-provisional of, and claims priority to, U.S. Provisional Patent Application Ser. No. 61/932,787, filed Jan. 29, 2014, the disclosure of which is incorporated herein by reference it its entirety.

BACKGROUND OF THE INVENTION

Embodiments of the invention relate generally to boat trailers and, more particularly, to a boat trailer guide that aids on centering a boat on the boat trailer and assists an operator in boarding and exiting the boat when on the water or on land.

Most recreational boats are stored and transported on a trailer that is towed by a personally owned vehicle. A standard boat trailer consists of a frame, two or more wheels attached to the frame, and a winch stand near the front of the trailer which supports a winch and cable system that facilitates loading and unloading the boat from the trailer and secures the boat on the trailer during transport.

A guide or guide system is also included on the boat trailer that aids in properly positioning the boat on the trailer during loading of the boat thereon, as it is recognized that proper positioning of the boat on the trailer is important to the safe movement of the trailer on the highways. For example, lateral positioning of the boat on the trailer is important not only for safe transportation, launching, and recovery, but also for protecting the hull of the boat.

Conventional boat trailer guides may be provided as a bunk style guide, a post style guide, or a roller style guide. Bunk style guides use longitudinally oriented boards located at the rear of the trailer, but elevated from the trailer frame so that they are above the water line while loading a boat onto the trailer from the water. Post style guides use vertically oriented posts typically secured to the rear of the trailer, with the posts being long enough to extend above the water line while loading a boat onto the trailer from the water. Roller style guides are like post style guides, but the posts are secured to bearings so that they roll. Each of the aforementioned style of guides are positioned so they are slightly wider than the boat in a position that will locate a floating boat laterally centered on a trailer that is submerged below the boat while loading the boat onto the trailer from the water.

While existing bunk style, post style guide, and roller style guides are effective in providing lateral guidance of a boat during loading, such guides are otherwise very limited in their functionality. For example, although most boat trailer guides allow adjustability during installation, all are relatively fixed once they are installed on the trailer. As one result of this lack of adjustability after installation, some existing boat trailer guides may damage the boat by vibrating against the hull during trailering due to their close proximity to the hull. As another result of this lack of adjustability after installation, existing boat trailer guides provide no additional aid other than functioning as a guide, such that—for example—the guides provide no assistance in boarding or exiting the boat.

Accordingly, it would be desirable to provide a boat trailer guide that exhibits a degree of adjustability after installation, so as to be selectively positionable during loading and trailering. It would also be desirable for the boat trailer guide to act as a multi-functional device that not only aids in properly positioning the boat on the trailer during loading of the boat thereon, but also provides assistance to an operator in boarding or exiting the boat.

BRIEF DESCRIPTION OF THE INVENTION

In accordance with one aspect of the invention, a boat trailer includes a trailer frame and a step-and-guide apparatus having a first guide mechanism and a second guide mechanism positioned on opposing sides of the frame. Each of the first guide mechanism and the second guide mechanism further includes a trailer mount assembly attachable to a side member of the frame, a bracket arrangement affixed to the trailer mount assembly, an arm having a first end and a second end, with a first end of the arm being rotatably coupled to the bracket arrangement, and a step-and-guide board affixed to the second end of the arm, the step-and-guide board being oriented longitudinally along a lengthwise direction of the boat. The arm and the step-and-guide board are rotatable between a first position and a second position defined by the bracket arrangement, with the step-and-guide board functioning as a step when in the first position and as a boat guide member when in the second position.

In accordance with another aspect of the invention, a trailer-mounted step-and-guide apparatus for aiding in aligning a boat on a boat trailer during loading and for aiding in boarding and exiting the boat is provided. The step-and-guide apparatus includes a trailer mount assembly affixable to a frame of the boat trailer, a step-and-guide arm attached to the trailer mount assembly via one or more brackets so as be rotatable relative to the frame of the boat trailer, and a step-and-guide board affixed to the step-and-guide arm at an end thereof distal from the brackets so as to be oriented longitudinally along a lengthwise direction of the boat. The step-and-guide arm is configured to rotate to a down position such that the step-and-guide board is positioned at an angle substantially parallel to a ground surface and is further configured to rotate to an up position such that the step-and-guide board is positioned at an angle that matches an angle of a hull of the boat.

In accordance with yet another aspect of the invention, a rotatable step useable with a boat trailer that includes a trailer frame is provided. The rotatable step includes an attachment bracket, a step arm pivotably mounted to the trailer frame via the attachment bracket so as be rotatable between an up position and a down position relative to the trailer frame, and a step board affixed to the step arm at an end thereof distal from the attachment bracket so as to be oriented longitudinally along a lengthwise direction of the boat. The step arm rests against the attachment bracket to position the step arm in the down position, with the step board aiding the operator in boarding and exiting the boat when in the down position, and the step arm interacts with the attachment bracket to position the step arm in the up position, with the step arm and step board being positioned so as to not extend out past a width of the trailer frame when in the up position.

In accordance with still another aspect of the invention, a rotatable step useable with a boat trailer that includes a trailer frame and a boat guide is provided. The rotatable step includes an attachment bracket coupled to a post of the boat guide, a step arm pivotably mounted to the attachment bracket so as be rotatable between an up position and a down position relative to the boat guide, and a step board affixed to the step arm at an end thereof distal from the attachment bracket so as to be oriented longitudinally along a lengthwise direction of the boat. The step arm rests against the attachment bracket to position the step arm in the down position, with the step board aiding the operator in boarding and exiting the boat when in the down position, and the step arm interacts with the attachment bracket to position the step arm in the up position, with the step arm and step board being positioned so as to not extend out past a width of the trailer frame when in the up position.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention relate generally to boat trailers and, more particularly, to a boat trailer guide that aids on centering a boat on the boat trailer and assists an operator in boarding and exiting the boat when on the water or on land. The boat trailer step-and-guide apparatus includes a number of step-and-guide boards or rails that are pivotably mounted to the frame of the boat trailer, such that they are rotatable to a number of distinct positions. When rotated to a down position, the step-and-guide boards function as steps that aid an operator in boarding and exiting the boat while on the water or while resting on the trailer on land. When rotated to an up position, the step-and-guide boards function as boat trailer guides that aid in aligning a boat on the frame during a loading of the boat thereon.

Figure 1:
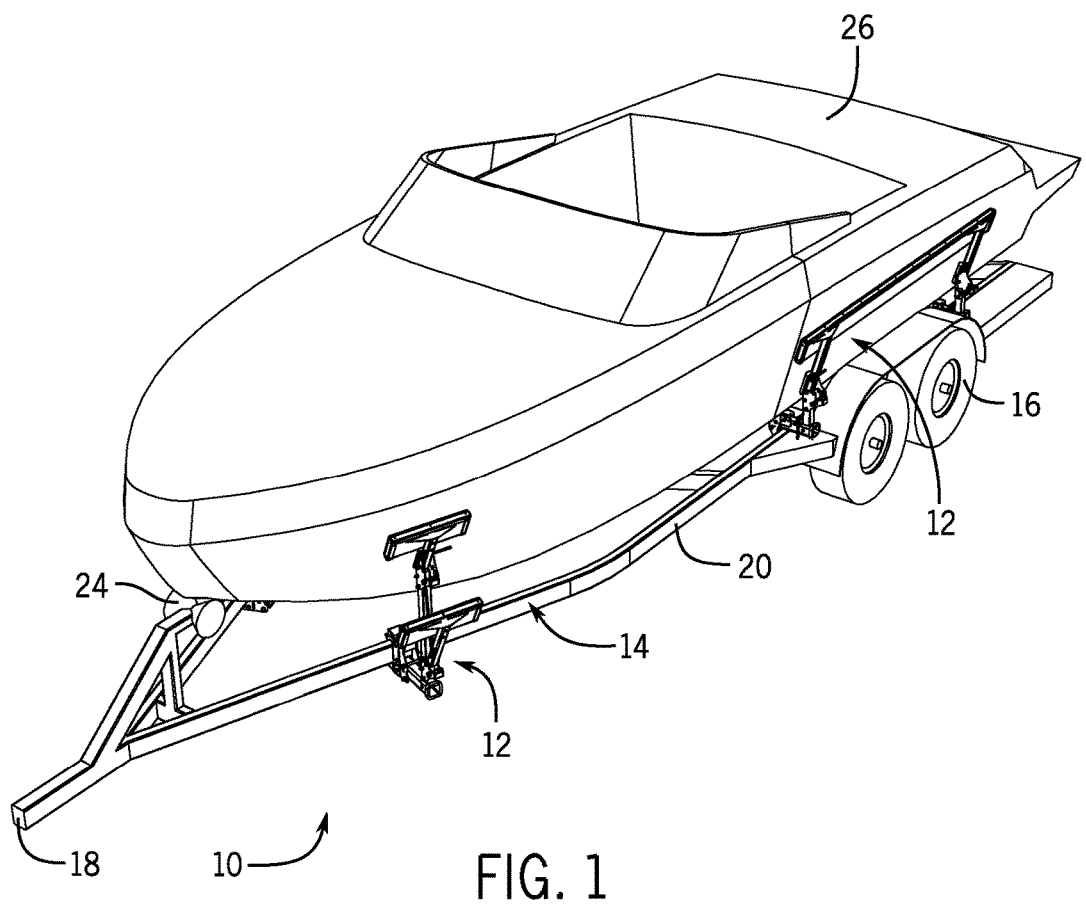
FIG. 1 is a perspective view of a boat trailer having a boat resting thereon, with the boat trailer having a number of step-and-guide apparatuses included thereon, according to an embodiment of the invention.
Figure 2:
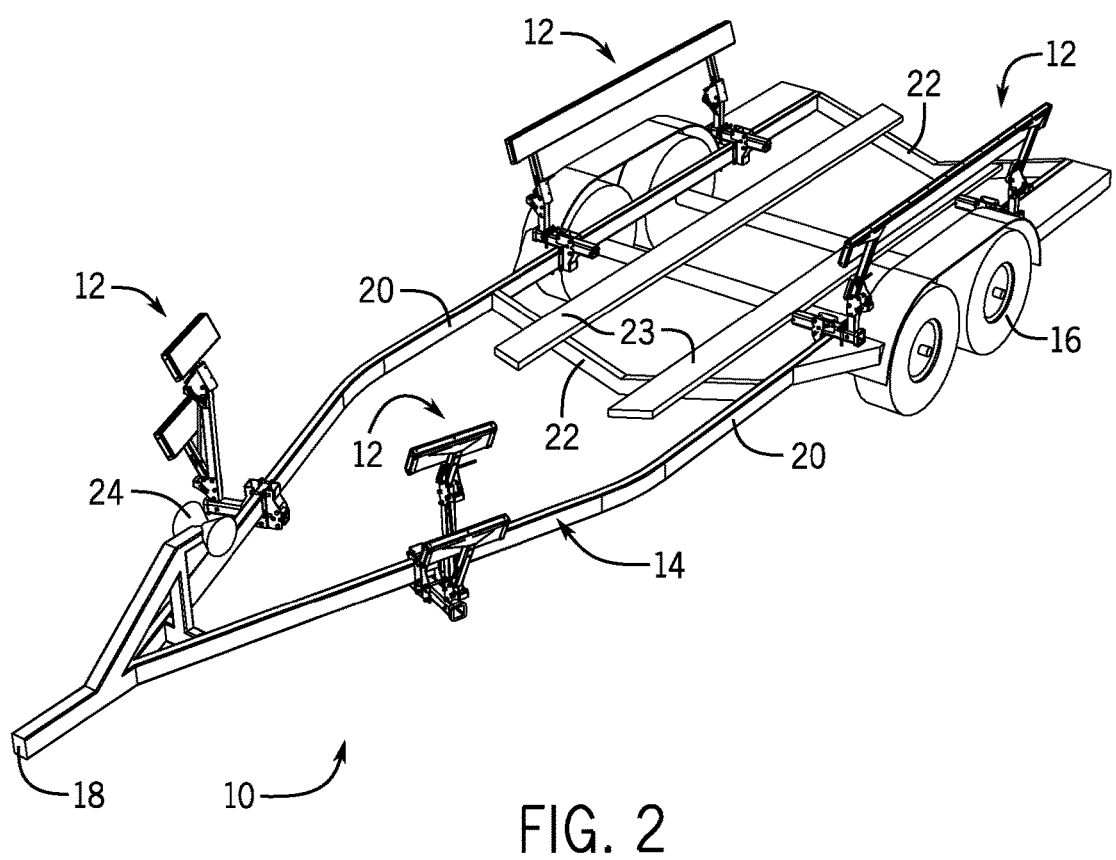
FIG. 2 is a perspective view of the boat trailer of FIG. 1 without the boat included thereon.

Referring to FIGS. 1 and 2, a boat trailer 10 incorporating a number of step-and-guide apparatuses 12 is shown according to an embodiment of the invention. The boat trailer 10 is formed of a frame 14 that includes wheels 16 affixed thereto along with a hitch 18 that allows for attachment of the trailer to a motor vehicle, such that the boat trailer 10 may be towed by such a vehicle. As best seen in FIG. 2, the frame 14 of the boat trailer 10 is formed from a pair of side members 20, cross members 22 extending between the side members, and bunk boards 23, with the bunk boards 23 mounted at an angle that generally corresponds to the shape of the boat hull. A winch and cable system 24 is affixed to the frame 14 at a front portion therein, with the winch and cable system 24 allowing for a pulling force to applied to a boat 26 (FIG. 1) being loaded onto the trailer 10.

As shown in FIGS. 1 and 2, a plurality of step-and-guide apparatuses 12 are included on the trailer 10 that are constructed to selectively serve as boat trailer guides that aid in aligning the boat 26 on the frame 14 during a loading of the boat and as steps that aid an operator in boarding and exiting the boat 26 while on the water or while resting on the trailer 10 on land. At minimum, a pair of step-and-guide apparatuses 12 are included on the boat trailer 10—with a step-and-guide apparatus 12 being provided on each side member 20 of the frame 14. However, as can be seen in FIG. 2, in one embodiment of the invention the trailer 10 includes two step-and-guide apparatuses 12 provided on each side member 20 of the frame 14—with one pair of step-and-guide apparatuses 12 being positioned on the frame 14 so as to be adjacent the stern/aft of the boat 26 when the boat is on the trailer 10 and another pair of step-and-guide apparatuses 12 being positioned on the frame 14 so as to be adjacent the bow of the boat 26 when the boat is on the trailer 10.

Figure 3:
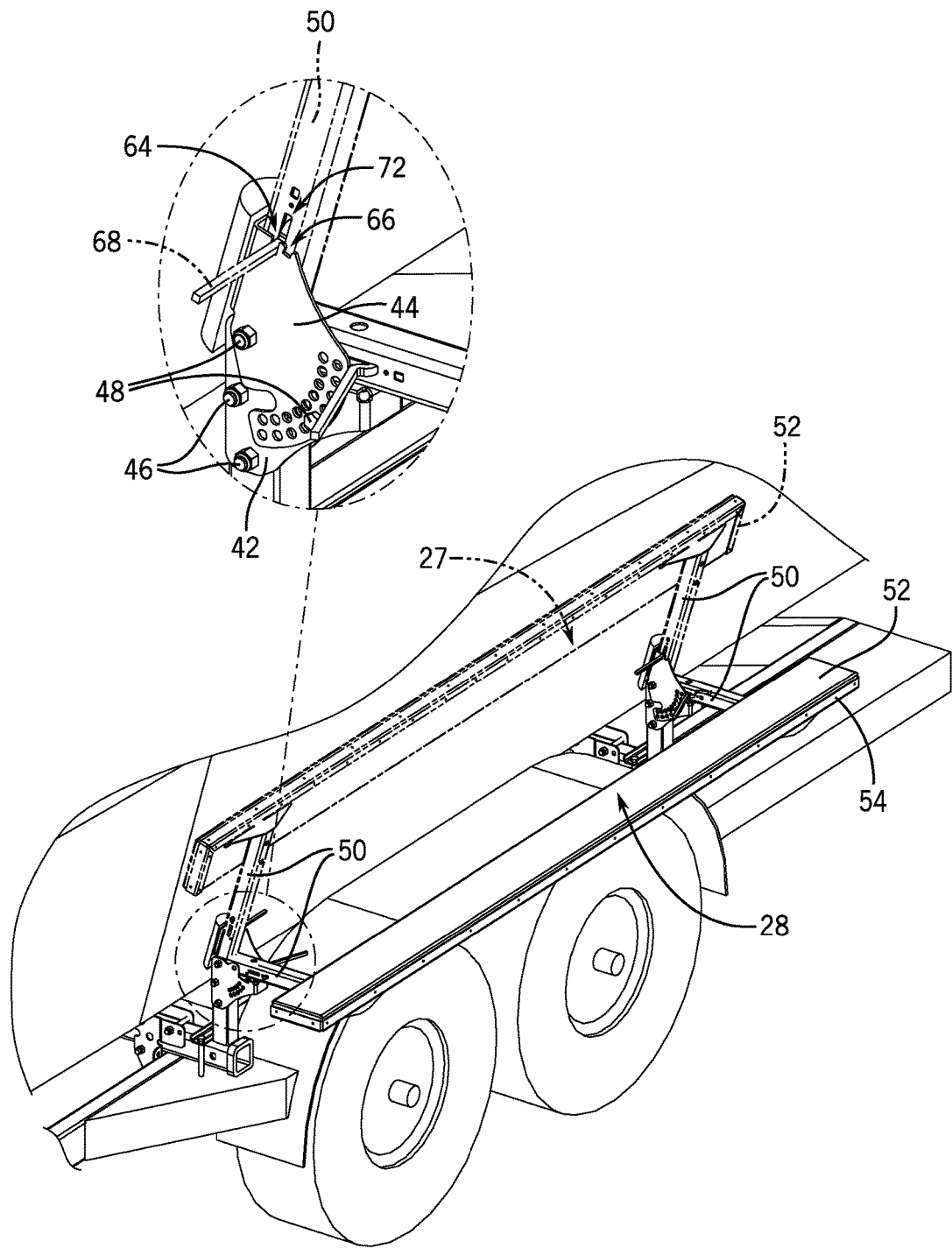
FIG. 3 is a detailed view of the boat trailer of FIG. 1 showing rotation of the step-and-guide apparatuses between "up" and "down" positions, according to an embodiment of the invention.

Referring now to FIGS. 3-10, more detailed views of one of the step-and-guide apparatuses 12—and of the individual components thereof—are shown. Referring first to FIG. 3, it is illustrated therein how the step-and-guide apparatus 12 is rotatable to a number of positions in order for the apparatus to function as both a boat guide and a step for the operator. FIG. 3 shows the step-and-guide apparatus 12 positioned when in an "up" position (shown in phantom lines)—indicated at 27—and in a "down" position (shown in solid lines)—indicated at 28—with the apparatus 12 functioning as a boat trailer guide that aids in aligning the boat 26 on the frame 14 during a loading of the boat when in the up position and functioning as a step that aids an operator in boarding and exiting the boat 26 while on the water or while resting on the trailer 10 on land when in the down position.

Figure 4:
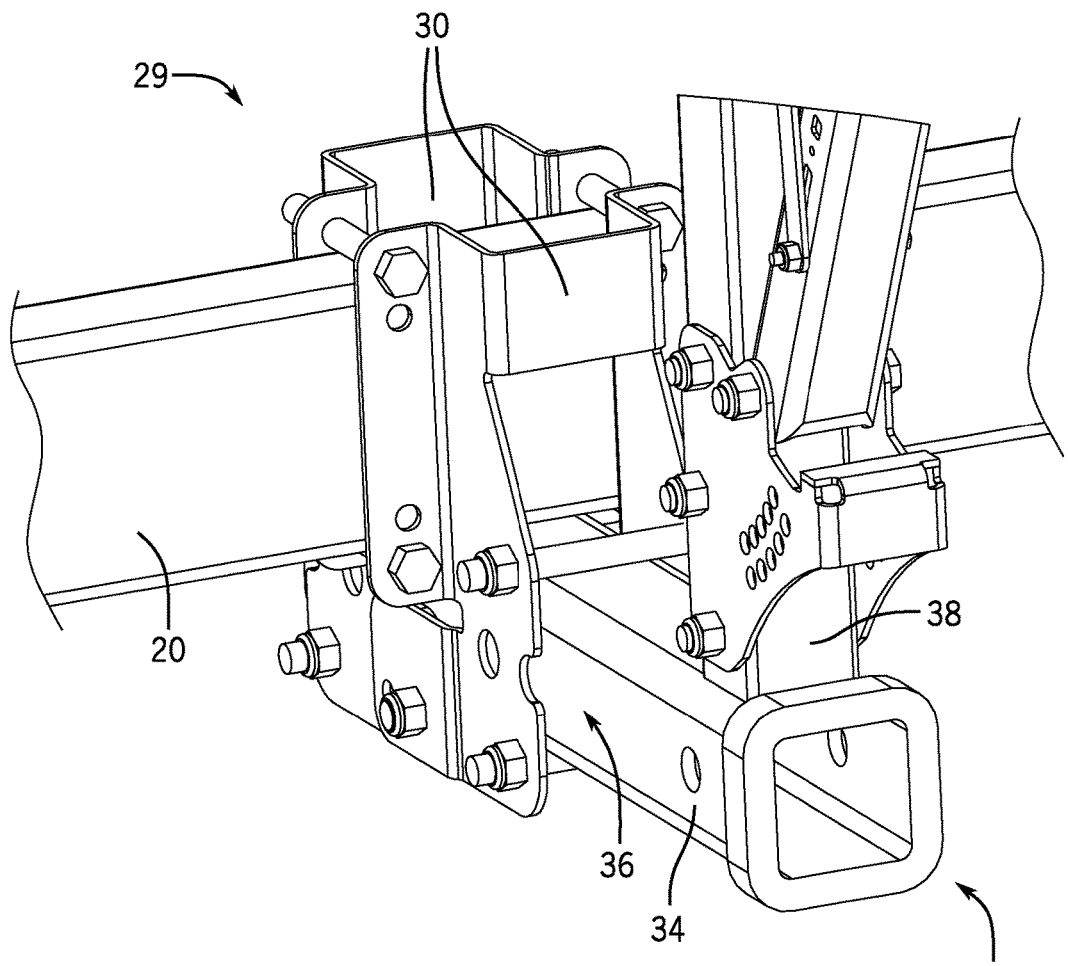
FIG. 4 is a detailed perspective view of a trailer mount assembly included in the step-and-guide apparatuses shown in FIGS. 1-3, according to an embodiment of the invention.

As best seen in FIGS. 3-6, the step-and-guide apparatus 12 includes a trailer mount assembly 29 that is coupleable to the frame 14 of the trailer 10 to secure the step-and-guide apparatus 12 to the frame 14. According to an exemplary embodiment, the trailer mount assembly 29 is formed of a pair of trailer brackets 30 that are joined together about a side member 20 of the frame 14 and of a base arm 32 that is inserted through the trailer brackets 30 and secured therein. As can be seen in FIG. 4, the two trailer brackets clamp to the side member 20 and to the base arm 32. The base arm 32 includes a horizontal member 34 whose lateral (i.e., in/out) position can be adjusted within an opening 36 through the trailer brackets 30, such that the base arm 32 extends out a desired distance from the frame 14. A vertical member 38 of the base arm 32 extends upward from the horizontal member 34 to a desired height and includes openings 40 formed therein to provide for attachment of components thereto. It is recognized that, in an alternative embodiment, each trailer mount assembly 29 may forego the trailer brackets 30 and be formed of just the base arm 32—which may be welded to a respective side member 20 of the frame 14 instead of bolting them via brackets 30.

Figure 6:
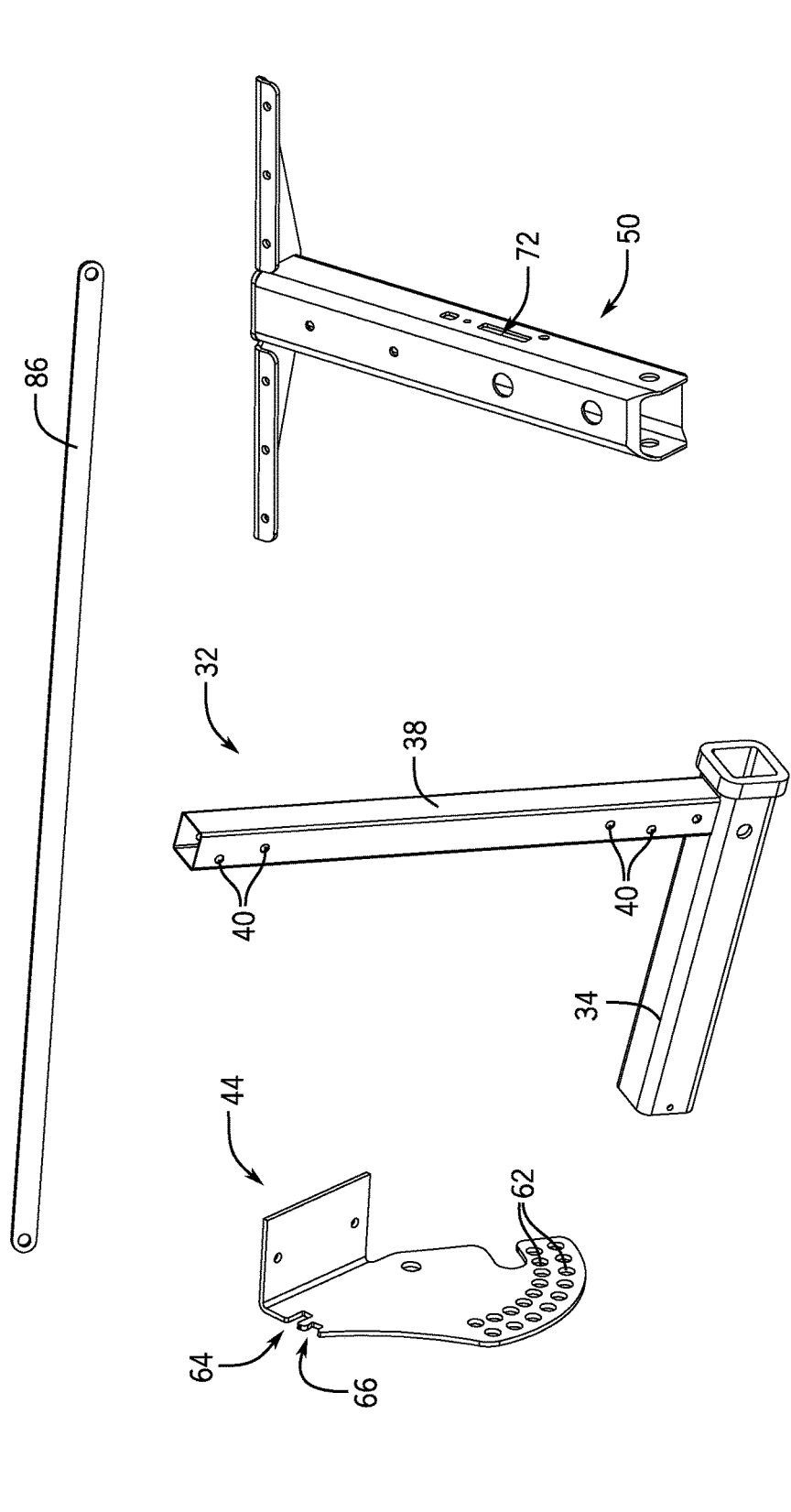

According to an exemplary embodiment of the invention, and as best seen in FIGS. 4 and 6, the base arm 32 is constructed such that it can also function as a trailer hitch receiver. That is, the horizontal member 34 of the base arm 32 is made of square tubing that has the same internal dimensions of a trailer hitch receiver that would typically be found on the back of pickup trucks and other tow vehicles (e.g., a 2" class III trailer hitch receiver). The square tubing forming the horizontal member 34 can accommodate any trailer hitch accessory, such as bike racks, cargo carriers, or electric wheelchair carriers, for example. As these items would typically need to be left behind/at home if the towing vehicle's hitch is being used to pull a boat, the trailer hitch receiver formed in the base arm 32 provides desirable functionality not currently found on existing boat trailers.

Referring again to FIG. 3, an arrangement of brackets 42, 44 is shown that is affixed to the vertical member 38 of the base arm of the trailer mount assembly 29. The arrangement of brackets 42, 44 includes a down-stop bracket 42 and an up-stop bracket 44, with the down-stop bracket 42 being secured to the vertical member 38 by way of fasteners 46 (e.g., bolts) and the up-stop bracket 44 being secured to the down-stop bracket 42 by way of fasteners 48 (e.g., pins/bolts). A step-and-guide arm 50 of the step-and-guide apparatus 12 is rotatably coupled to the arrangement of brackets 42, 44, with a step-and-guide board 52 being affixed to the step-and-guide arm 50 at an end thereof distal from the brackets 42, 44. As can be seen in FIG. 3, the step-and-guide board 52 is oriented longitudinally along a lengthwise direction of the trailer 10 (and boat), such that they serve as bunk style boat guides for the trailer 10. According to an exemplary embodiment, the step-and-guide board 52 is made of wood or metal and fitted with padding or carpeting to avoid damaging the side of the boat. A step trim 54—shown in greater detail in FIG. 5—is included on the step-and-guide board 52 to add rigidity thereto.

In the embodiment shown in FIG. 3, the step-and-guide board 52 is constructed as a longer bunk style arm (e.g., up to 7 ft in length) that is supported by two base arms 32, with the longer step-and-guide board 52 providing optimum guiding capabilities when loading the boat on the trailer 10. In addition to (or alternative to) such a "long" step-and-guide board 52 being provided, a shorter step-and-guide board (e.g., 16" in length) that is each supported by a single base arm 32 may also/instead be provided. As an example, and as illustrated in FIGS. 1 and 2, these "short" step-and-guide boards 52 may be positioned at the front of the trailer 10, near the bow of the boat. While not shown in FIGS. 1 and 2, the "long" step-and-guide boards 52 could instead by provided as "short step-and-guide boards 52 each having a single base arm 32, as it is recognized that such short boards would have a reduced cost.

Figure 5:
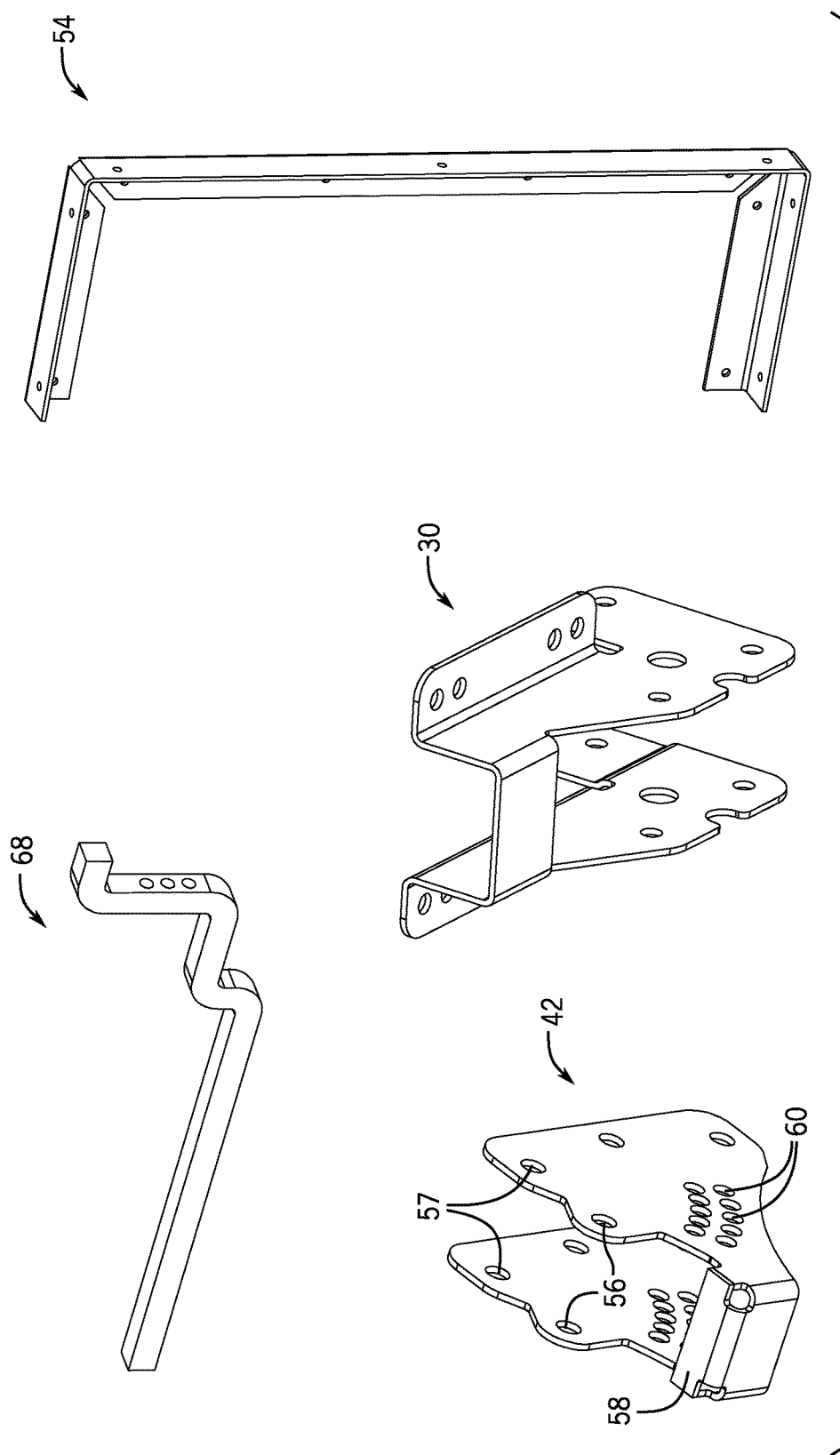
FIGS. 5 and 6 are detailed perspective views of the latch, step trim, down-stop bracket, trailer bracket, tie bar, up-stop bracket, base arm, and step-and-guide arm components included in the step-and-guide apparatuses shown in FIGS. 1-3, according to an embodiment of the invention.

Referring now to FIGS. 5 and 6, the construction of the down-stop bracket 42 and up-stop bracket 44 are shown more clearly therein. The down-stop bracket 42 includes pin holes 56 formed therein configured to receive a pin for rotatably coupling the step-and-guide arm 50 to the down-stop bracket 42, and also includes a protrusion 58 that abuts the step-and-guide arm 50 when the arm and the step-and-guide board 52 are in the down position. A plurality of alignment holes 60 are formed in the down-stop bracket 42 that interact with a plurality of alignment holes 62 formed in the up-stop bracket 44, so as to provide for a desired angular positioning/fastening of the up-stop bracket 44 on the down-stop bracket 42. Respective alignment holes 62 in the up-stop bracket 44 are alignable with respective alignment holes 60 in the down-stop bracket 42 so as to provide for positioning of a bolt through a matching alignment hole 60, 62 in each of the up-stop bracket 44 and the down-stop bracket 42, thereby mounting the up-stop bracket 44 to the down-stop bracket 42 at the desired angle.

The angle at which the up-stop bracket 44 is secured to the down-stop bracket 42 sets the angle at which the step-and-guide arm 50 and the step-and-guide board 52 will be set when in the up position. According to an exemplary embodiment, this up position angle can be set at any angle between straight vertical and 45 degrees—with it being understood that the angle will be set so as to match the angle of the hull of the boat that will be loaded onto the trailer 10. It is recognized, however, that the up position angle could also be set at an angle of less than 45 degrees relative to horizontal, so as to accommodate an even greater variety of hulls. The alignment holes 60, 62 are formed in the down-stop and up-stop brackets 42, 44 such that a hole from each bracket will align with the other every one degree in the angular range specified above.

Figure 7:
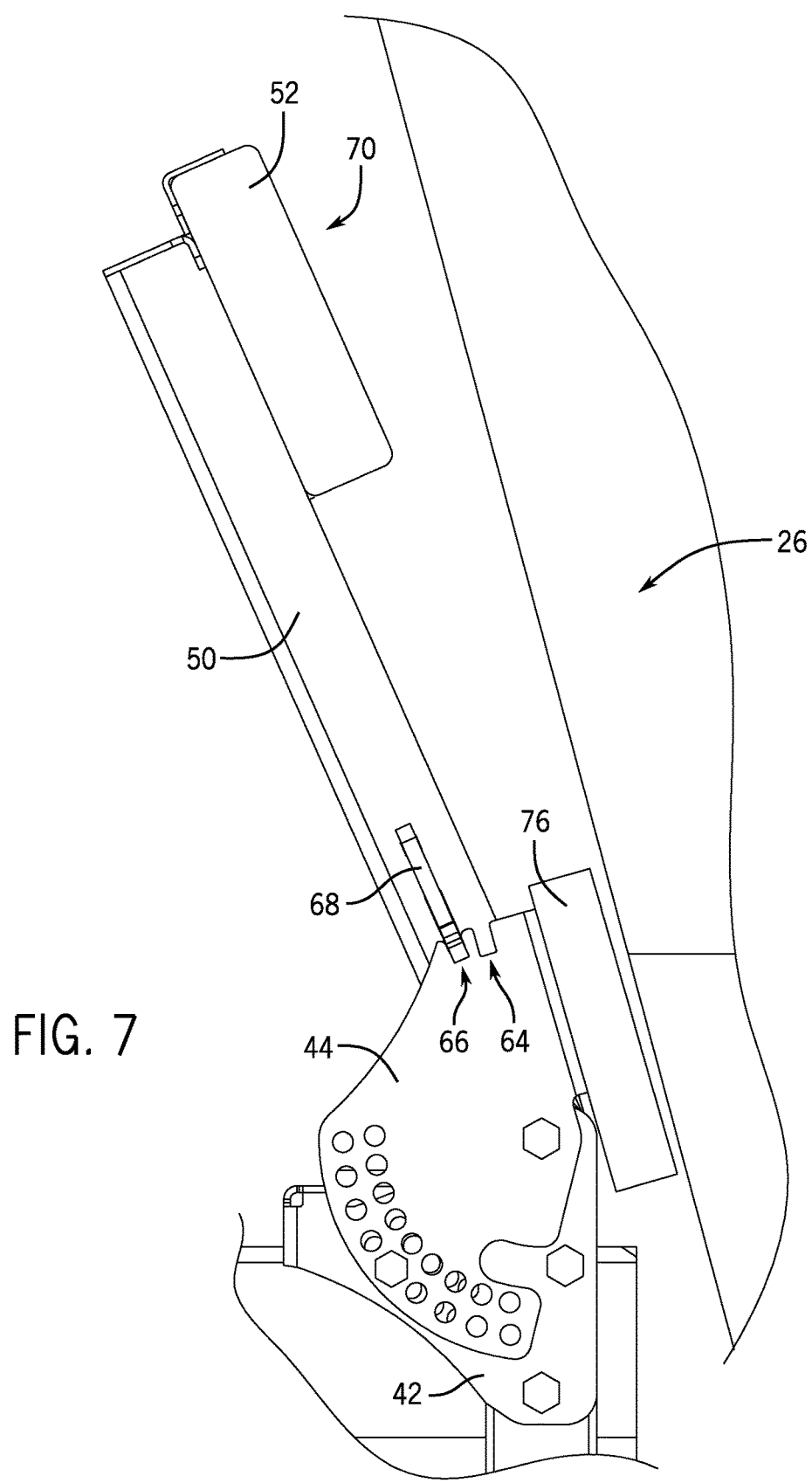
FIG. 7 is a detailed view of a portion of one of the step-and-guide apparatuses shown in FIG. 8, with the step-and-guide arm and step-and-guide board in a "trailer" position, according to an embodiment of the invention.
Figure 8:
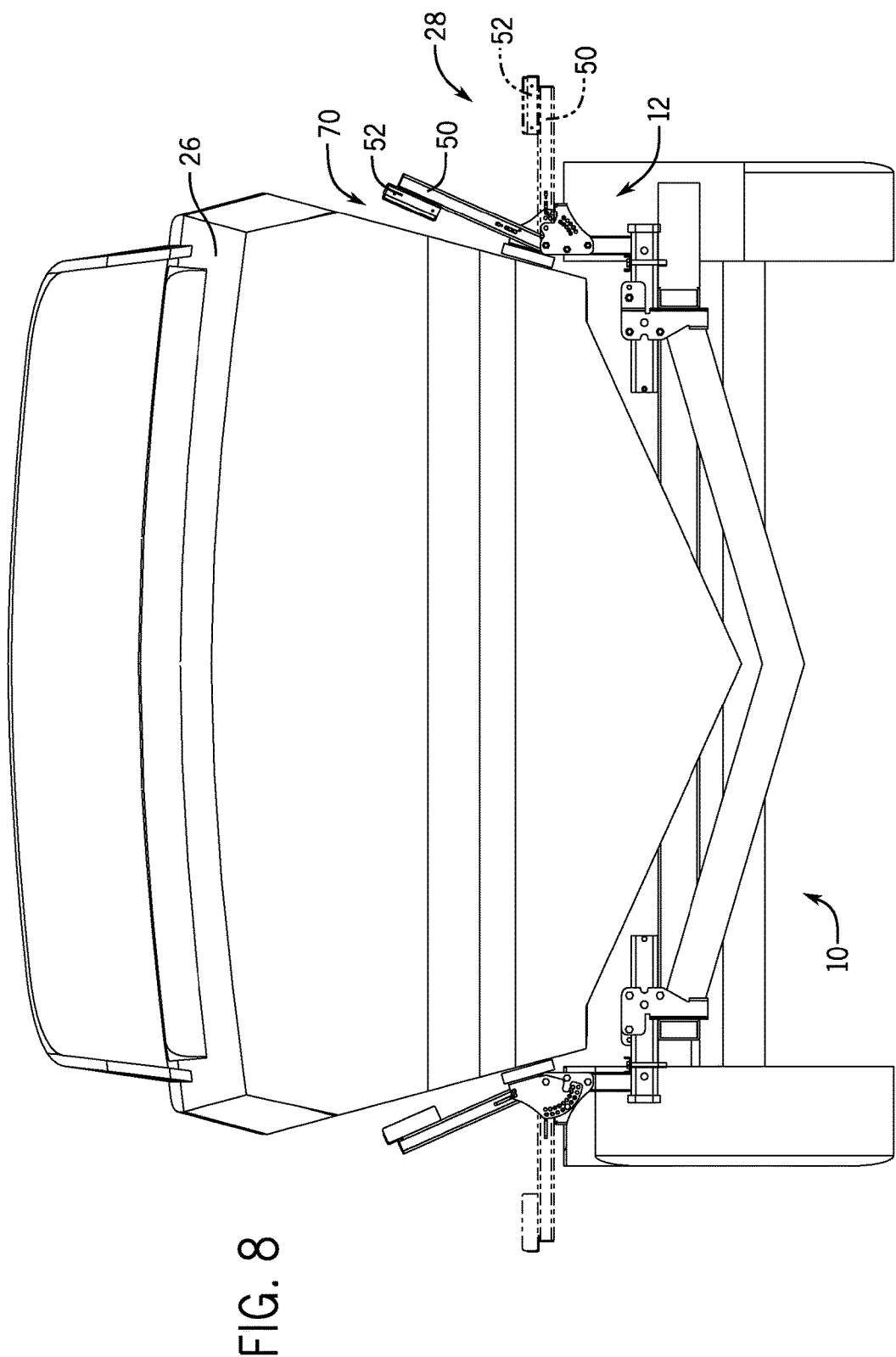
FIG. 8 is a rear view of the boat trailer and the aft step-and-guide apparatuses shown in FIGS. 1-3, illustrating a width of the boat trailer with the step-and-guide apparatuses in the "trailer" position and the "down" position, according to an embodiment of the invention.

Referring still to FIGS. 5 and 6, and also to FIG. 3, it is seen that the up-stop bracket 44 also includes a number of detents or grooves 64, 66 formed in an upper surface thereof that interact with a latch 68 included on the step-and-guide arm 50 in order to secure the arm in a fixed position relative to the up-stop bracket 44. According to an exemplary embodiment, two detents are formed in the up-stop bracket 44—a primary detent 64 that positions the step-and-guide arm 50 in the up position when the latch 68 is received therein and a secondary detent 66 that positions the step-and-guide arm 50 in what is termed to be a "trailer" position when the latch 68 is received therein. The trailer position is illustrated in FIGS. 7 and 8—indicated as 70—and is a position within an angular range defined by the up position and the down position, with the trailer position 70 being closer to the up position than to the down position—i.e., in proximity to the up position, such as within 5-10 degrees thereof, for example. The trailer position holds the step-and-guide board 52 farther away from the hull of the boat than when it is in the up position—so as to prevent the step-and-guide board 52 from vibrating against the hull when the boat is being trailered. As can be seen in FIG. 8, while positioning the step-and-guide boards 52 in the trailer position 70 holds the step-and-guide boards such that they do not vibrate against the hull when the boat is being trailered, the step-and-guide boards 52 are also positioned so that they do not extend out past a width of the frame 14 and wheels 16 of the boat trailer 10, such that the step-and-guide boards 52 do not cause the width of the trailer 10 to exceed a maximum allowable width (i.e., Department of Transportation (DOT) width regulations) during trailering.

Referring back to FIG. 3, and as can be seen therein, the latch 68 of the step-and-guide arm 50 is positioned within a slot 72 formed in the step-and-guide arm 50 (also shown in FIG. 6) in a manner that allows for the latch 68 to attach and pivot within the slot 72. The latch 68 is configured as a spring-return latch that allows for translation of the latch within the slot in an up and down fashion responsive to a force applied thereto by an operator. In operation, when an operator desires to translate the step-and-guide arm 50 and step-and-guide board 52—such as from the down position to the up position or trailer position, the operator may lift the latch 68 and push the step-and-guide arm 50 toward the detents 64, 66. When the latch 68 reaches a detent 64, 66 of the up-stop bracket 44, the latch translates downward and is received in a detent 64, 66 so as to secure the step-and-guide arm 50 and step-and-guide board 52 in either the up position or the trailer position.

Figure 9:
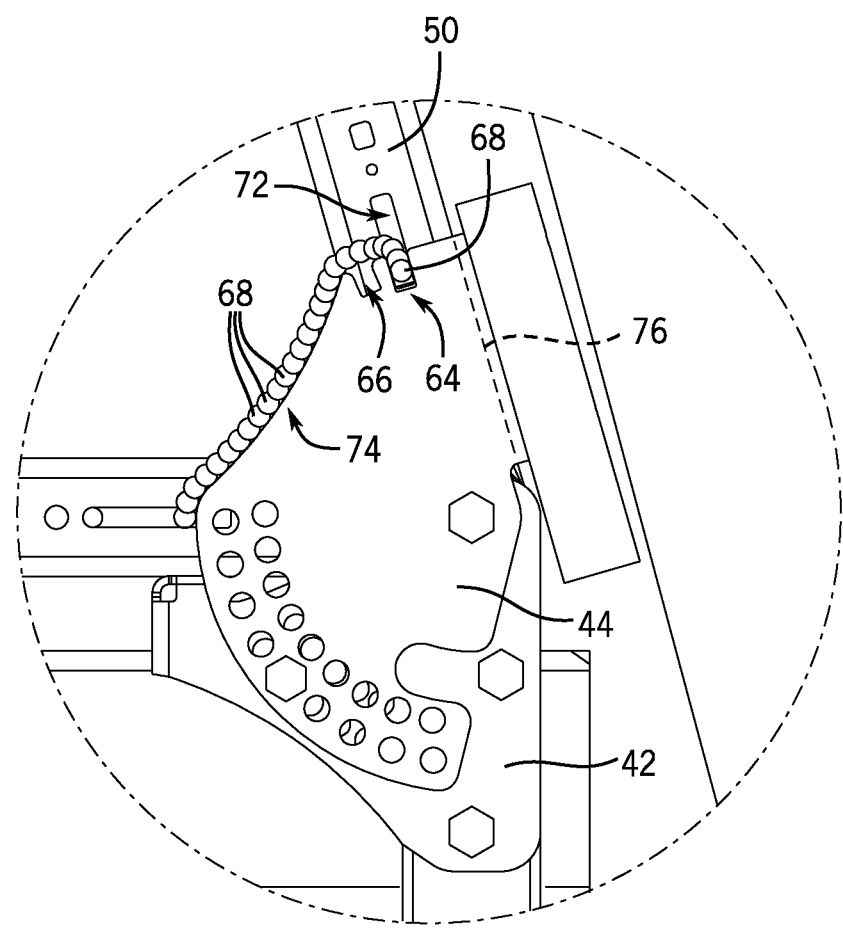
FIG. 9 is a detailed side view of a portion of one of the step-and-guide apparatuses shown in FIGS. 1-3, illustrating the path of the latch as the step-and-guide apparatus is slammed into the "up" position.
Figure 10A:
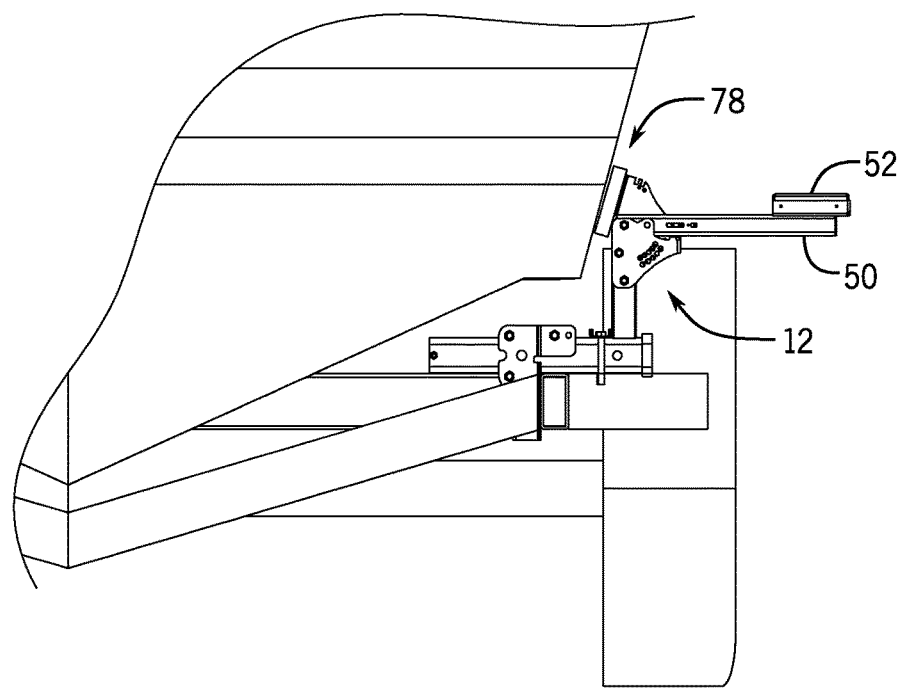
FIGS. 10A and 10B show detailed rear and perspective views of a protective rub pad included in the step-and-guide apparatuses shown in FIGS. 1-3, according to an embodiment of the invention.
Figure 10B:
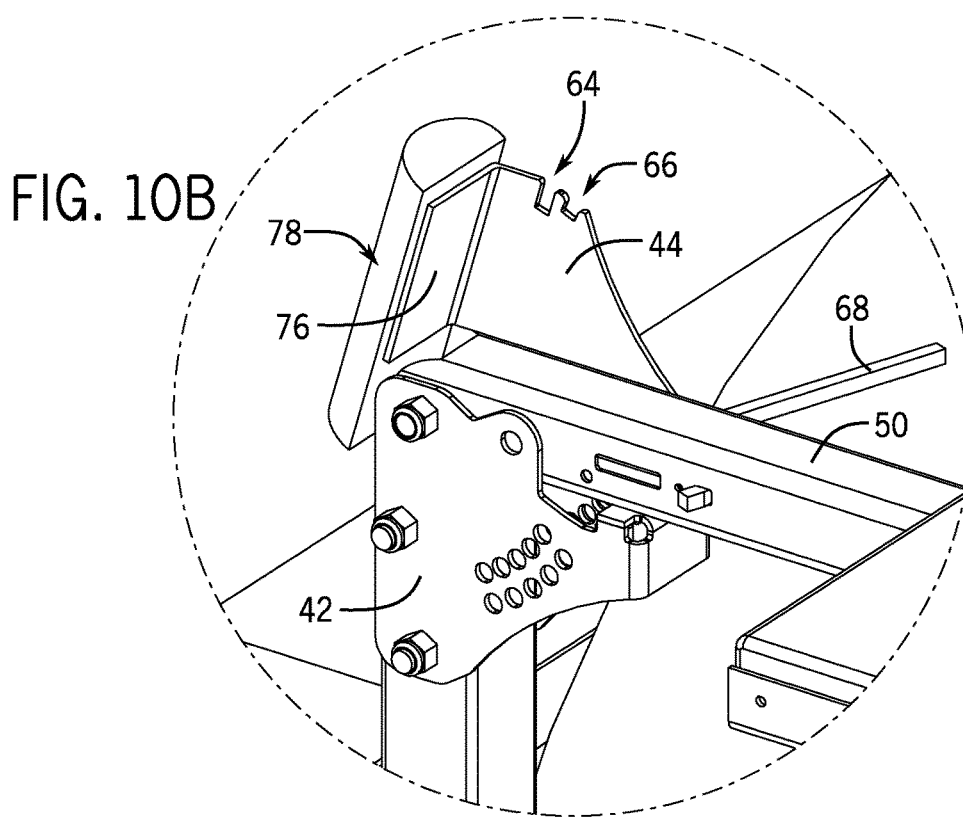

According to one embodiment, and as illustrated in FIGS. 9 and 10, an upper surface of the up-stop bracket 44 along which the latch 68 slides is contoured as a ramp-type feature 74, such that the step-and-guide arm 50 can be accelerated up the ramp 74 and slammed into the up position without the latch 68 catching on the secondary (trailer position) detent 66. That is, as seen in the translation of the latch 68 along ramp 74 illustrated in FIG. 9, the latch 68 skips over the secondary detent 66 when being slammed to the up position. To prevent an "overshoot" of the latch 68 past the primary detent 64 when the step-and-guide arm 50 is slammed toward the up position, a secondary stop 76 (FIG. 10) is provided on the up-stop bracket 44 adjacent the primary detent 64 (and opposite the secondary detent 66). When the step-and-guide arm 50 reaches the secondary stop 76 (FIG. 10), the secondary stop 76 causes the latch 68 to drop down into the primary detent, thereby preventing an overshoot and securing the step-and-guide arm 50 in the up position.

While the detents 64, 66 in the up-stop bracket 44 function to secure the step-and-guide arm 50 and step-and-guide board 52 in the up position and the trailer position, the down position of the step-and-guide arm 50 and step-and-guide board 52 is achieved via use of the down-stop bracket 42. That is, the latch 68 of the step-and-guide arm 50 does not mate with any detent formed in the up-stop bracket 44 when the step-and-guide arm 50 and step-and-guide board 52 are moved to the down position, but instead the step-and-guide arm 50 and step-and-guide board 52 are rested against a flat surface of the protrusion 58 (FIG. 5) on the down-stop bracket 42 to support the step-and-guide arm 50 in that position, as can be seen in FIG. 3.

It is recognized that, due to the ability to position the step-and-guide boards 52 in a down position, up position, or trailer position, there is a possibility that a boat may accidentally be launched to the water or retrieved from the water while the step-and-guide boards 52 are in one of the down position or the trailer position. When a loading or unloading of the boat is attempted with the step-and-guide boards 52 in one of these positions, it is possible that the hull of the boat may rub against the metal components of the trailer step-and-guide apparatuses 12. Accordingly, in one embodiment of the invention, a rub pad 78 is connected to a farthest protruding part of an up-stop bracket 44 of the step-and-guide apparatuses 12, as can be seen in FIG. 10. The rub pad 78 prevents the hull of the boat from rubbing against the metal components of the step-and-guide apparatuses 12, with the rub pad 78 being mounted to the up-stop bracket 44 such that the rub pad 78 is at the same angle that the up-stop bracket 44 is set to, which is intended to be the angle of the hull of the boat.

Figure 11:
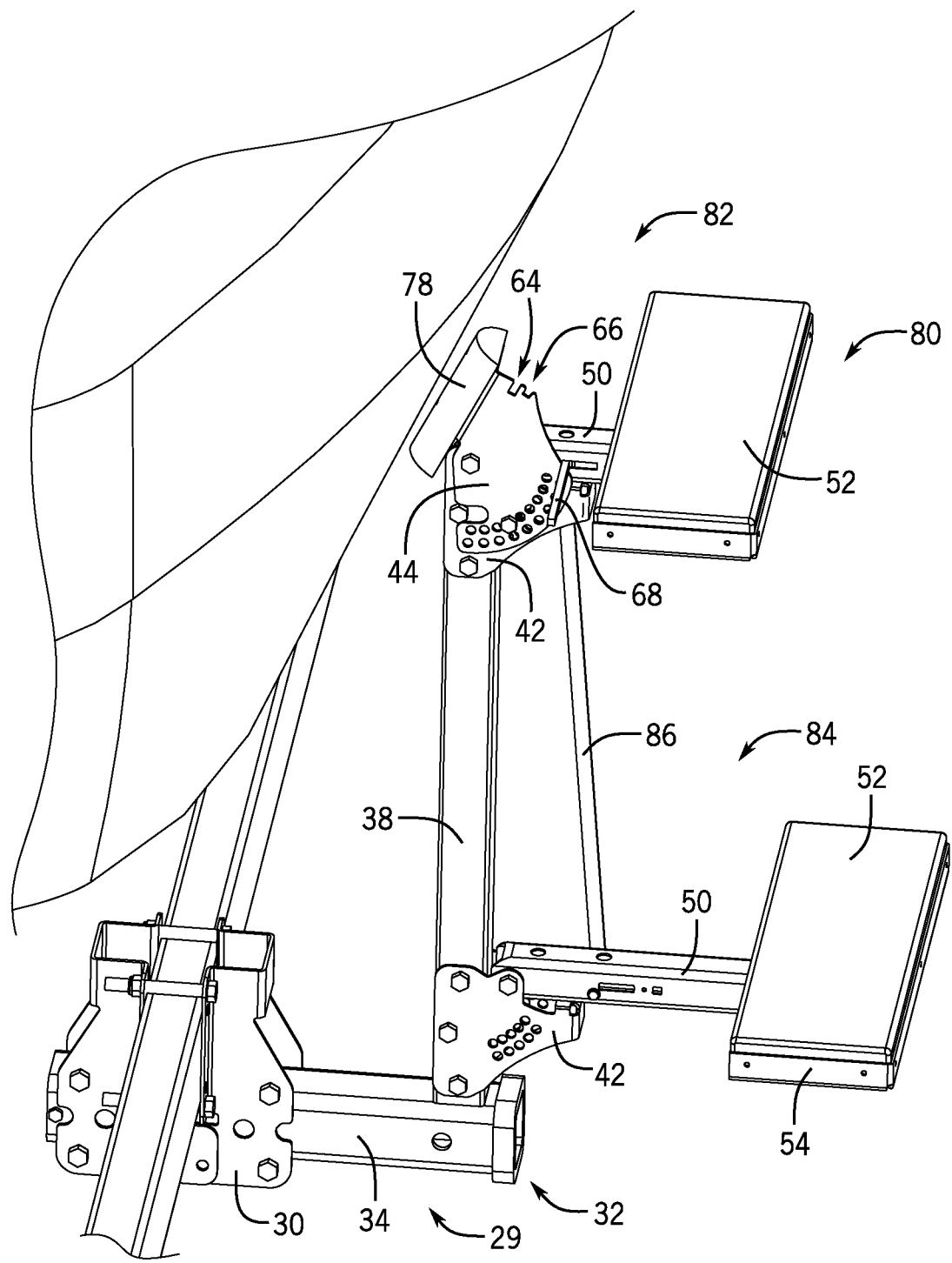
FIG. 11 is a perspective view of a two-step step-and-guide apparatus, according to an embodiment of the invention.

Referring now to FIG. 11, a step-and-guide apparatus 80 having a "two-step" construction that provides additional assistance to an operator in boarding and exiting the boat is shown according to another embodiment of the invention.

The two-step step-and-guide apparatus 80 may, as an example, be positioned near the front of the trailer, adjacent the bow of the boat. The two-step step-and-guide apparatus 80 includes a first an upper step/guide 82 and a lower step/guide 84 that are vertically offset from one another, with the upper step/guide 82 and the lower step/guide 84 also being horizontally offset due to a step-and-guide arm 50 of the lower step/guide 84 having an increased length as compared to a step-and-guide arm 50 of the upper step/guide 82. While each of these components of the two-step step-and-guide apparatus 80 are described here as a "step/guide", it is recognized that only the upper step/guide 82 would actually function as a guide for the boat, as the lower step/guide 84 would not be positioned to actually guide the boat as it is being loaded onto the trailer. Similar to the single step step-and-guide apparatuses, the upper step/guide 82 and the lower step/guide 84 are movable between an up position and a down position (and, in one embodiment, into a trailer position).

Similar to the single step step-and-guide apparatuses illustrated in FIGS. 1-10, the two-step step-and-guide apparatus 80 is mounted to the frame 14 of the trailer 10 via a trailer mount assembly 29—with the trailer mount assembly 29 including trailer brackets 30 that are joined together about a side member 20 of the frame 14 and a base arm 32 that is inserted through the trailer brackets 30 and secured therein. The upper step/guide 82 is mounted on the base arm 32 in a fashion identical to that of the single-step step-and-guide apparatus 12—with a down-stop bracket 42 being secured to the vertical member 38 of the base arm 32 by way of one or more fasteners (e.g., bolts) and an up-stop bracket 44 being secured to the down-stop bracket 42 by way of one or more fasteners (e.g., pins/bolts). A step-and-guide arm 50 is rotatably coupled to the arrangement of brackets 42, 44, with a step-and-guide board 52 being affixed to the step-and-guide arm 50 at an end thereof distal from the brackets so as to form the upper step/guide 82.

Similar as to described above with the single step step-and-guide apparatuses 12, when an operator desires to translate the step-and-guide arm 50 and step-and-guide board 52 of the upper step/guide 82 from the down position to the up position (or trailer position), the operator may lift a latch 68 of the step-and-guide arm 50 and push the step-and-guide arm 50 toward detents 64, 66 formed in the up-stop bracket 44. The latch 68 slides along the up-stop bracket 44 until reaching a detent 64, 66, at which point the latch translates downward and is received in a detent 64, 66 so as to secure the step-and-guide arm 50 and step-and-guide board 52 in the up position (or the trailer position). The step-and-guide arm 50 and step-and-guide board 52 of the upper step/guide 82 may be translated to the down position by lifting the latch 68 out of the detent 64, 66 and moved downward until the step-and-guide arm 50 rests against the down-stop bracket 42, such that the step-and-guide arm 50 is supported in that position.

The lower step/guide 84 is constructed differently than the upper step/guide 82 in a manner such that the position thereof is dictated by the position of the upper step/guide 82. The lower step/guide 84 is secured to the vertical member 38 of the base arm 32 via a down-stop bracket 42 in a manner similar to the upper step/guide 82—with lower step/guide 84 being pivotably attached to a down-stop bracket 42 via insertion of a pin into pin holes 57 (FIG. 5) formed in the bracket, as compared to pin holes 56 being used for pivotably attaching upper step/guide 82 to a down-stop bracket 42. However, the lower step/guide 84 does not include an up-stop bracket 44 or latch 68 in the step-and-guide arm 50 thereof. Instead, the step-and-guide arm 50 and step-and-guide board 52 of the lower step/guide 84 are caused to be translated based on a tie bar 86 coupled between the step-and-guide arm 50 of the upper step/guide 82 and the step-and-guide arm 50 of the lower step/guide 84. The tie bar 86 causes the step-and-guide board 52 of the upper step/guide 82 and step-and-guide board 52 of the lower step/guide 84 to rotate together when the upper step/guide 82 is translated. Additionally, the lower step/guide 84 is maintained in an up position or trailer position based on the tie bar 86 and on the interaction of the latch 68 and detent 64, 66 on the step-and-guide arm 50 and up-stop bracket 44, respectively, of the upper step/guide 82.

While the step-and-guide apparatus 80 of FIG. 11 is shown and described as having a two-step construction, it is recognized that the step-and-guide apparatus 80 could instead have a three-step or four-step construction that provides even greater assistance to an operator in boarding and exiting the boat. Thus, embodiments of the inventions are not to be limited to only a one and two step step-and-guide apparatus 80. In an apparatus 80 with three or more steps, the additional steps may be constructed similar to the lower step/guide 84—with a tie bar 86 connecting the additional step(s) to a first step (e.g., upper step/guide 82) in a manner such that the position of the additional step(s) is/are dictated by the position of the upper step/guide 82.

While embodiments of the invention provided above describe a step-and-guide apparatus that is pivotably mounted to the frame of the boat trailer so as to enable the apparatus to function as both a boat trailer guide and step, additional embodiments of the invention are directed to a pivotably mounted step that is separate from a boat trailer guide that is included on the trailer. Such a step may be incorporated into the structure of the boat guide or may be provided as a stand-alone step. In each instance, the step is constructed such that it pivots up and in when not in use, so as to not increase the width of the trailer during towing.

Figure 12:
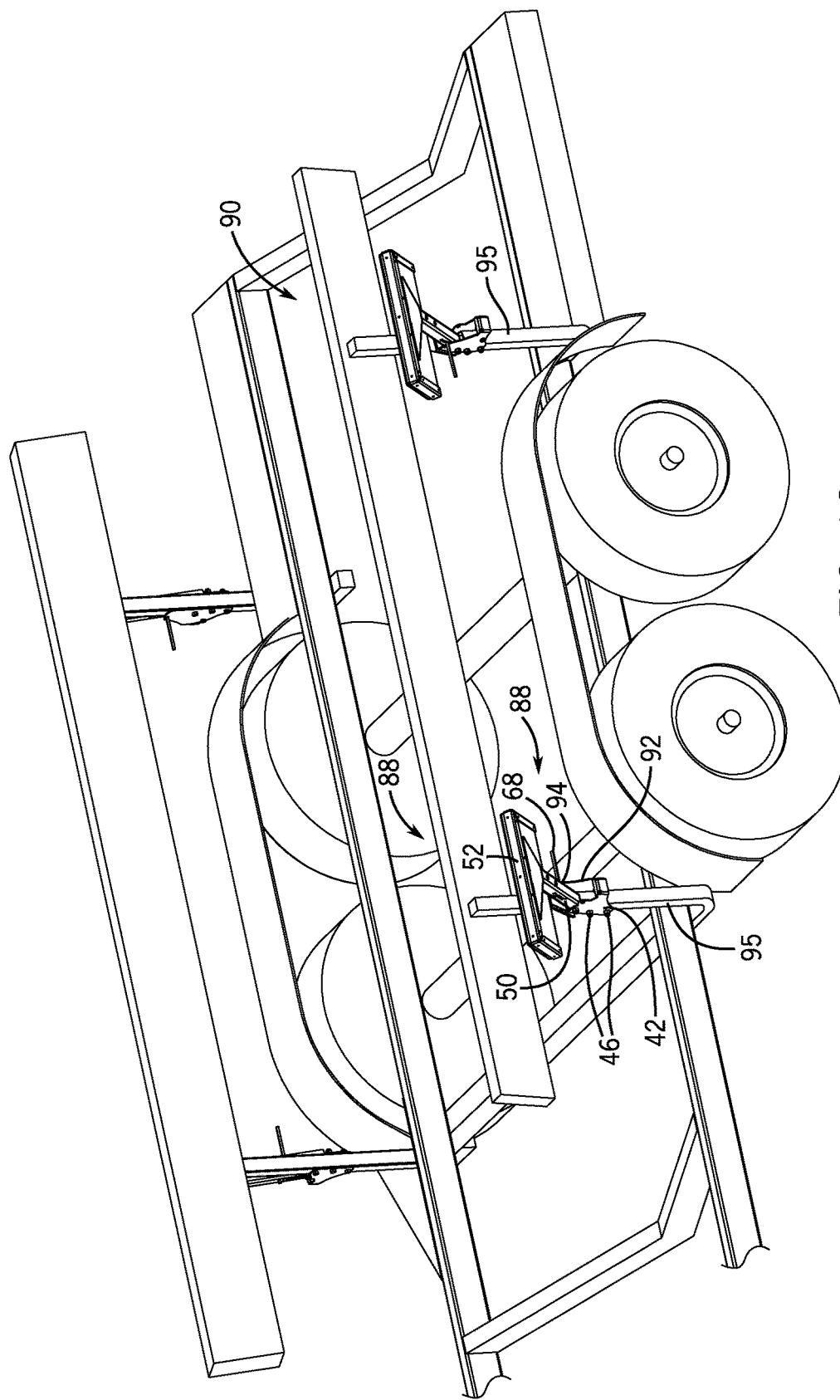
FIG. 12 is a perspective view of a boat trailer having a rotatable step incorporated onto an existing boat guide of the trailer, according to an embodiment of the invention.

Referring to FIG. 12, a rotatable trailer step 88 that may be incorporated into/onto an existing boat guide 90 is shown according to an embodiment. The construction of the rotatable trailer step 88 is substantially similar to that of the step-and-guide apparatus 12 previously described, and thus like elements therein are numbered to correspond to those elements in the apparatus 12. As shown in FIG. 12, the rotatable trailer step 88 includes an attachment bracket 92. A step arm 50 is rotatably coupled to the attachment bracket 92, with a step board 52 being affixed to the step arm 50 at an end thereof distal from the bracket. When an operator desires to translate the rotatable trailer step 88 from a down position to an up position, the operator may lift a latch 68 of the step arm 50 and push the step arm 50 toward an up position detent 94 formed in the attachment bracket 92. It is noted that the attachment bracket includes only a single detent 94, as opposed to the primary and secondary detents 64, 66 in the up-stop bracket 44 of step-and-guide apparatus 12. The latch 68 slides along the attachment bracket 92 until reaching the detent 94, at which point the latch received in the detent 94 so as to secure the step arm 50 and step board 52 in the up position. The step arm 50 and step board 52 may be translated to the down position by lifting the latch 68 out of the detent 94 and moving the step arm and step board downward until the step arm 50 rests against the down-stop bracket 42, such that the step arm 50 is supported in that position.

In the embodiment illustrated in FIG. 12, the rotatable trailer step 88 is affixed to boat guide 90 via the attachment bracket 92 by way of a plurality of bolts or fasteners 46 that mate with holes formed in posts 95 of the boat guide 90. It is recognized, however, that the rotatable trailer step 88 could be affixed to boat guide 90 via other suitable means, such as welding.

Figure 13:
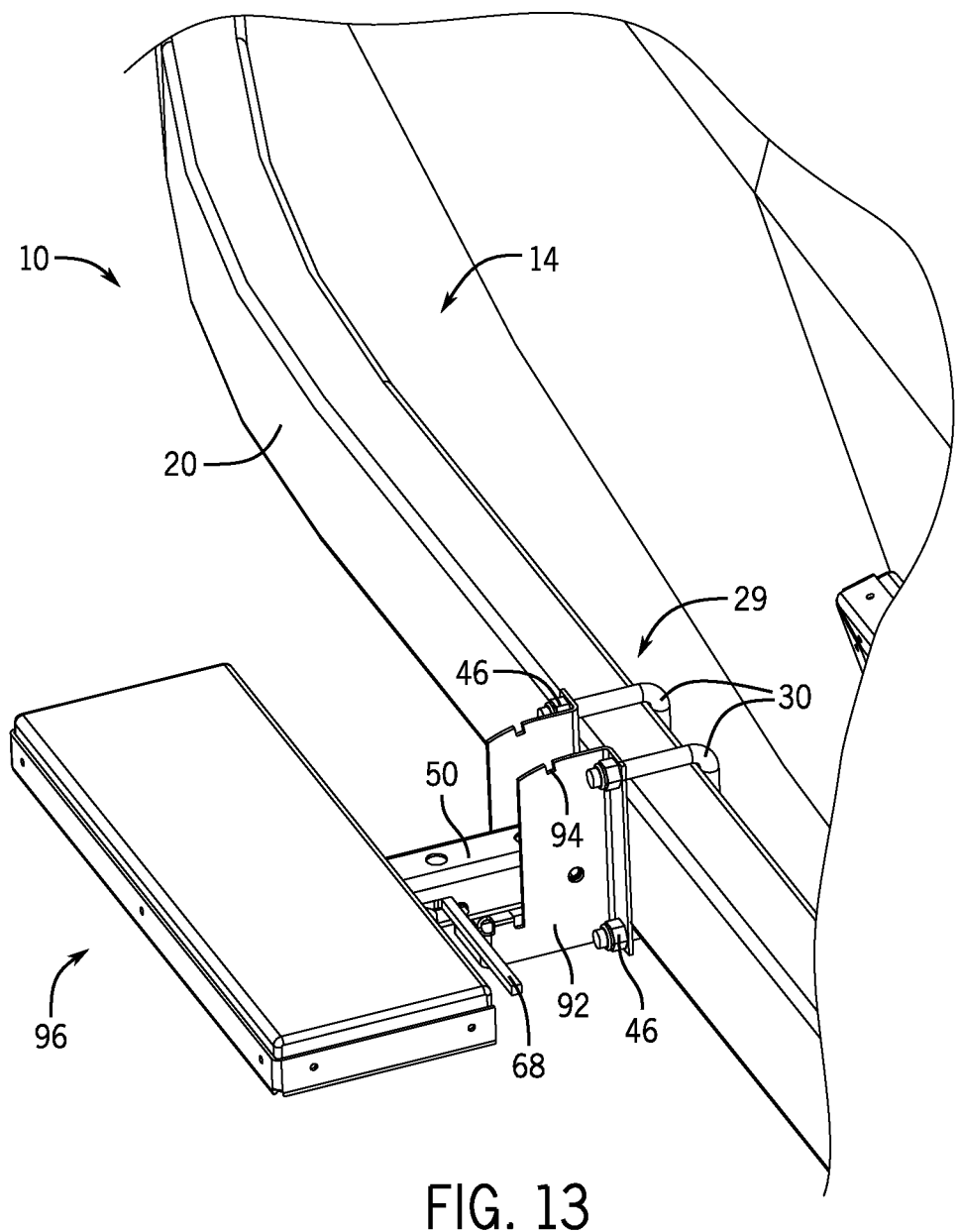
FIG. 13 is a perspective view of a stand-alone rotatable step mounted onto a boat trailer, according to an embodiment of the invention.

Referring now to FIG. 13, a stand-alone rotatable trailer step 96 that may be included on a boat trailer as a stand-alone step is shown according to an embodiment. The construction and functionality of the stand-alone rotatable trailer step 96 may be similar to that of the rotatable trailer step 88 shown and described in FIG. 12, except that the step 96 is securable directly to the frame 14 of the boat trailer 10. As shown in FIG. 13, the rotatable trailer step 96 includes a trailer mount assembly 29 having trailer brackets 30 that are joined together about a side member 20 of the frame 14. An attachment bracket 92 of the rotatable trailer step 96 is fastened to the mount assembly 29 by way of bolts/fasteners 46. In an alternative embodiment, it is recognized that the trailer mount assembly 29 could be welded directly onto the side member 20 of the frame 14.

As previously described, when an operator desires to translate the stand-alone rotatable trailer step 96 from a down position to an up position, the operator may lift a latch 68 of a step arm 50 and push the step arm 50 toward an up position detent 94 formed in the attachment bracket 92. It is noted that attachment bracket 92 includes only a single detent 94, as opposed to the primary and secondary detents 64, 66 in the up-stop bracket 44 of step-and-guide apparatus 12. The latch 68 catches in the detent 94 so as to secure the step arm 50 and step board 52 in the up position. The step arm 50 and step board 52 may be translated to the down position by lifting the latch 68 out of the detent 94 and moving the step arm and step board downward until the step arm 50 rests against the attachment bracket 92, such that the step arm 50 is supported in that position.

It is recognized that additional embodiments of the invention are envisioned beyond those specifically described above. More specifically, different mechanisms (and arrangements thereof) for securing the step-and-guide arm in the up position are recognized as being within the scope of the invention. As one example, a latch is provided on the up-stop bracket and the detents are formed in the step-and-guide arm—as opposed to the latch being provided on the step-and-guide arm and detents being formed in the up-stop bracket. As additional examples—and in lieu of a latch and detent mating feature—the step-and-guide arm and the step-and-guide board may be secured in the up position by way of friction devices, toggle clamps, spring detents, straps, or other suitable securing/fastening devices.

Beneficially, embodiments of the invention thus provide a boat trailer step-and-guide apparatus that includes a number of step-and-guide boards or rails that are pivotably mounted to the frame of the boat trailer, such that they are rotatable to a number of distinct positions. When rotated to a down position, the step-and-guide boards function as steps that aid an operator in boarding and exiting the boat while on the water or while resting on the trailer on land. When rotated to an up position, the step-and-guide boards function as boat trailer guides that aid in aligning a boat on the frame during a loading of the boat thereon. Additional embodiments of the invention provide a rotatable step that may be provided as a step attachable to an existing boat guide or as a stand-alone step—with the rotatable step being rotatable between an up position and a down position to selectively provide boarding/exiting assistance to an operator and also minimizing an overall width of the trailer when the step is in the up position.

Therefore, according to one embodiment, a boat trailer includes a trailer frame and a step-and-guide apparatus having a first guide mechanism and a second guide mechanism positioned on opposing sides of the frame. Each of the first guide mechanism and the second guide mechanism further includes a trailer mount assembly attachable to a side member of the frame, a bracket arrangement affixed to the trailer mount assembly, an arm having a first end and a second end, with a first end of the arm being rotatably coupled to the bracket arrangement, and a step-and-guide board affixed to the second end of the arm, the step-and-guide board being oriented longitudinally along a lengthwise direction of the boat. The arm and the step-and-guide board are rotatable between a first position and a second position defined by the bracket arrangement, with the step-and-guide board functioning as a step when in the first position and as a boat guide member when in the second position.

According to another embodiment, a trailer-mounted step-and-guide apparatus for aiding in aligning a boat on a boat trailer during loading and for aiding in boarding and exiting the boat is provided. The step-and-guide apparatus includes a trailer mount assembly affixable to a frame of the boat trailer, a step-and-guide arm attached to the trailer mount assembly via one or more brackets so as be rotatable relative to the frame of the boat trailer, and a step-and-guide board affixed to the step-and-guide arm at an end thereof distal from the brackets so as to be oriented longitudinally along a lengthwise direction of the boat. The step-and-guide arm is configured to rotate to a down position such that the step-and-guide board is positioned at an angle substantially parallel to a ground surface and is further configured to rotate to an up position such that the step-and-guide board is positioned at an angle that matches an angle of a hull of the boat.

According to yet another embodiment, a rotatable step useable with a boat trailer that includes a trailer frame is provided. The rotatable step includes an attachment bracket, a step arm pivotably mounted to the trailer frame via the attachment bracket so as be rotatable between an up position and a down position relative to the trailer frame, and a step board affixed to the step arm at an end thereof distal from the attachment bracket so as to be oriented longitudinally along a lengthwise direction of the boat. The step arm rests against the attachment bracket to position the step arm in the down position, with the step board aiding the operator in boarding and exiting the boat when in the down position, and the step arm interacts with the attachment bracket to position the step arm in the up position, with the step arm and step board being positioned so as to not extend out past a width of the trailer frame when in the up position.

According to still another embodiment, a rotatable step useable with a boat trailer that includes a trailer frame and a boat guide is provided. The rotatable step includes an attachment bracket coupled to a post of the boat guide, a step arm pivotably mounted to the attachment bracket so as be rotatable between an up position and a down position relative to the boat guide, and a step board affixed to the step arm at an end thereof distal from the attachment bracket so as to be oriented longitudinally along a lengthwise direction of the boat. The step arm rests against the attachment bracket to position the step arm in the down position, with the step board aiding the operator in boarding and exiting the boat when in the down position, and the step arm interacts with the attachment bracket to position the step arm in the up position, with the step arm and step board being positioned so as to not extend out past a width of the trailer frame when in the up position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A boat trailer comprising:
   a trailer frame; and
   a step-and-guide apparatus comprising a first guide mechanism and a second guide mechanism positioned on opposing sides of the frame, wherein each of the first guide mechanism and the second guide mechanism comprises:
   a trailer mount assembly attachable to a side member of the trailer frame;
   a bracket arrangement affixed to the trailer mount assembly;
   a pad connected directly to the bracket arrangement and positioned so as to face a hull of a boat to be loaded on the boat trailer;
   an arm comprising a first end and a second end, with a first end of the arm being rotatably coupled to the bracket arrangement; and
   a step-and-guide board affixed to the second end of the arm, the step-and-guide board being oriented longitudinally along a lengthwise direction of the boat;
   wherein the arm and the step-and-guide board are rotatable between a first position and a second position defined by the bracket arrangement, with the step-and-guide board functioning as a step when in the first position and as a boat guide member when in the second position, with the arm and the step-and-guide board moving downwardly and outwardly when rotating from the second position to the first position; and
   wherein the pad remains in contact with the hull when the arm and the step-and-guide board are in either of the first position or the second position.

2. The boat trailer of claim 1 wherein the arm comprises a latch formed thereon that is mateable with the bracket arrangement to hold the arm in a fixed position, with the arm including slots or holes formed therein in which the latch attaches and pivots.

3. The boat trailer of claim 1 wherein each of the first guide mechanism and the second guide mechanism comprises a single mount assembly, a single bracket arrangement, and a single arm, with the step-and-guide board being horizontally centered on the arm.

4. The boat trailer of claim 1 wherein each of the first guide mechanism and the second guide mechanism comprises a pair of mount assemblies, a pair of bracket arrangements, and a pair of arms, with the step-and-guide board extending between the pair of arms.

5. The boat trailer of claim 1 wherein each of the first guide mechanism and the second guide mechanism further comprises a rub pad affixed to the bracket arrangement, the rub pad being positioned so as to face a hull of a boat to be loaded on the boat trailer.

6. A boat trailer comprising:
   a trailer frame; and a step-and-guide apparatus comprising a first guide mechanism and a second guide mechanism positioned on opposing sides of the frame, wherein each of the first guide mechanism and the second guide mechanism comprises:
  a trailer mount assembly attachable to a side member of the trailer frame;
  a bracket arrangement affixed to the trailer mount assembly;
  a pad connected to the bracket arrangement;
  an arm comprising a first end and a second end, with a first end of the arm being rotatably coupled to the bracket arrangement; and
  a step-and-guide board affixed to the second end of the arm, the step-and-guide board being oriented longitudinally along a lengthwise direction of the boat;
  wherein the arm and the step-and-guide board are rotatable between a first position and a second position defined by the bracket arrangement, with the step-and-guide board functioning as a step when in the first position and as a boat guide member when in the second position;
wherein the arm comprises a latch formed thereon that is mateable with the bracket arrangement to hold the arm in a fixed position, with the arm including slots or holes formed therein in which the latch attaches and pivots; and
wherein the bracket arrangement comprises an up-stop bracket, the up-stop bracket including:
  one or more detents each configured to receive the latch therein to hold the arm in a fixed position, the one or more detents securing the arm and the step-and-guide board in at least the second position; and
  a plurality of alignment holes that provide for mounting of the up-stop bracket at a desired angle.

7. The boat trailer of claim 6 wherein the one or more detents comprises:
  a primary detent that provides for positioning of the arm and the step-and-guide board in the second position when the latch is received therein; and
  a secondary detent that provides for positioning of the arm and the step-and-guide board in a third position when the latch is received therein;
  wherein the third position is within an angular range defined by the first position and the second position, with the third position being closer to the second position than to the first position.

8. The boat trailer of claim 7 wherein the second and third positions angularly position the arm and the step-and-guide board such that they do not extend out past a width of the trailer frame.

9. The boat trailer of claim 6 wherein the up-stop bracket further comprises:
  a ramp formed on an upper surface thereof leading up to the primary and secondary detents, the ramp configured to cause the latch to skip over the secondary detent when the step-and-guide arm is slammed toward the up position; and
  a secondary stop located adjacent the primary detent and opposite from the secondary detent, the secondary stop preventing an overshoot of the latch past the primary detent when the step-and-guide arm is slammed toward the up position.

10. The boat trailer of claim 6 wherein the bracket arrangement comprises a down-stop bracket affixed to the trailer mount assembly and to the up-stop bracket, the down-stop bracket comprising:

a protrusion that abuts the arm when the arm and the step-and-guide board are in the first position;
  pin holes configured to receive a pin therein for rotatably coupling the arm to the down-stop bracket; and
  a plurality of alignment holes, wherein respective alignment holes in the up-stop bracket are alignable with respective alignment holes in the down-stop bracket so as to provide for positioning of a bolt through a matching alignment hole in each of the up-stop bracket and the down-stop bracket, thereby mounting the up-stop bracket to the down-stop bracket at the desired angle.

11. The boat trailer of claim 10 wherein the desired angle at which the up-stop bracket is mounted to the down-stop bracket matches an angle of the hull.

12. The boat trailer of claim 10 wherein each of the first guide mechanism and the second guide mechanism further comprises:
  at least one additional down-stop bracket affixed to the trailer mount assembly; and
  at least one additional arm rotatably coupled to the at least one additional down-stop bracket; and
  at least one additional step-and-guide board affixed to the at least one additional arm;
  wherein each of the at least one additional down-stop bracket, the at least one additional arm and the at least one additional step-and-guide board is vertically offset from the down-stop bracket, the arm and the step-and-guide board, respectively.

13. The boat trailer of claim 12 wherein each of the first guide mechanism and the second guide mechanism further comprises a tie bar coupled between the arm and the at least one additional arm, with the tie bar causing the step-and-guide board and the at least one additional step-and-guide board to rotate together when the step-and-guide board is translated between the first position and the second position.

14. A boat trailer comprising:
  a trailer frame; and
  a step-and-guide apparatus comprising a first guide mechanism and a second guide mechanism positioned on opposing sides of the frame, wherein each of the first guide mechanism and the second guide mechanism comprises:
    a trailer mount assembly attachable to a side member of the trailer frame;
    a bracket arrangement affixed to the trailer mount assembly;
    a pad connected to the bracket arrangement;
    an arm comprising a first end and a second end, with a first end of the arm being rotatably coupled to the bracket arrangement; and
    a step-and-guide board affixed to the second end of the arm, the step-and-guide board being oriented longitudinally along a lengthwise direction of the boat;
    wherein the arm and the step-and-guide board are rotatable between a first position and a second position defined by the bracket arrangement, with the step-and-guide board functioning as a step when in the first position and as a boat guide member when in the second position; and
    wherein the trailer mount assembly comprises:
      trailer brackets securable to the side member of the trailer frame; and
      a base arm inserted through the trailer brackets and secured therein, the base arm including:

a horizontal member secured in the trailer brackets and extending out a desired distance from the frame; and a vertical member extending upward from the horizontal member, the vertical member including openings formed therein to provide for attachment of the bracket arrangement thereto;

wherein the horizontal member is constructed of square tubing so as to comprise a trailer hitch receiver that accommodates a trailer hitch accessory.

15. A trailer-mounted step-and-guide apparatus for aiding in aligning a boat on a boat trailer during loading and for aiding in boarding and exiting the boat, the step-and-guide apparatus comprising:

a trailer mount assembly affixable to a frame of the boat trailer;

a step-and-guide arm attached to the trailer mount assembly via one or more brackets so as be rotatable relative to the frame of the boat trailer;

a pad connected directly to one of the one or more brackets so as to face a hull of the boat; and a step-and-guide board affixed to the step-and-guide arm at an end thereof distal from the brackets so as to be oriented longitudinally along a lengthwise direction of the boat;

wherein the step-and-guide arm is configured to rotate to a down position such that a first surface of the step-and-guide board is positioned at an angle substantially parallel to a ground surface;

wherein the step-and-guide arm is configured to rotate to an up position such that the first surface of the step-and-guide board is positioned at an angle that matches an angle of the hull of the boat and is positioned to face the hull of the boat; and wherein the pad remains in contact with the hull when the step-and-guide arm and the step-and-guide board are in either of the down position or the up position.

16. The step-and-guide apparatus of claim 15 further comprising:

at least one secondary step-and-guide arm attached to the trailer mount assembly;

a secondary step-and-guide board affixed to each of the at least one secondary step-and-guide arms; and a tie bar coupled between the step-and-guide arm and each of the at least one secondary step-and-guide arms, with the tie bar causing the step-and-guide arm and each respective secondary step-and-guide arm to rotate together when the step-and-guide arm is translated between the up position and the down position;

wherein each of the at least one secondary step-and-guide arms and its corresponding secondary step-and-guide board is vertically offset from the step-and-guide arm and the step-and-guide board, respectively.

17. The step-and-guide apparatus of claim 15 wherein the step-and-guide board is affixed to a pair of step-and-guide arms, with each of the step-and-guide arms in turn being attached to a respective trailer mount assembly, with the step-and-guide board comprising an elongated board that extends between the pair of step-and-guide arms.

18. A trailer-mounted step-and-guide apparatus for aiding in aligning a boat on a boat trailer during loading and for aiding in boarding and exiting the boat, the step-and-guide apparatus comprising:

a trailer mount assembly affixable to a frame of the boat trailer;

a step-and-guide arm attached to the trailer mount assembly via one or more brackets so as be rotatable relative to the frame of the boat trailer; and a step-and-guide board affixed to the step-and-guide arm at an end thereof distal from the brackets so as to be oriented longitudinally along a lengthwise direction of the boat;

wherein the step-and-guide arm is configured to rotate to a down position such that the step-and-guide board is positioned at an angle substantially parallel to a ground surface;

wherein the step-and-guide arm is configured to rotate to an up position such that the step-and-guide board is positioned at an angle that matches an angle of a hull of the boat; and wherein the one or more brackets comprise:

a down-stop bracket affixed to the trailer mount assembly and configured to interact with the step-and-guide arm to retain the step-and-guide arm in the down position; and an up-stop bracket affixed to the down-stop bracket and configured to interact with the step-and-guide arm to retain the step-and-guide arm in the up position;

wherein the step-and-guide arm is pivotably attached to the down-stop bracket to provide for rotation between the up position and the down position.

19. The step-and-guide apparatus of claim 18 wherein the up-stop bracket includes at least one detent formed therein; and wherein the step-and-guide arm includes a latch formed thereon that is mateable with the at least one detent formed to hold the step-and-guide arm in a fixed position.

20. The step-and-guide apparatus of claim 19 wherein the at least one detent comprises:

a primary detent that provides for positioning of the step-and-guide arm in the up position when the latch is received therein; and a secondary detent that provides for positioning of the arm and the step-and-guide board in a trailer position when the latch is received therein;

wherein the trailer position is within an angular range defined by the up position and the down position, with the trailer position being proximate to the up position.

21. The step-and-guide apparatus of claim 18 wherein each of the up-stop bracket and the down-stop bracket include a plurality of alignment holes formed therein, wherein respective alignment holes in the up-stop bracket are alignable with respective alignment holes in the down-stop bracket so as to provide for positioning of a bolt through a matching alignment hole in each of the up-stop bracket and the down-stop bracket, thereby mounting the up-stop bracket to the down-stop bracket at the desired angle.

* * * * *